2,890,155

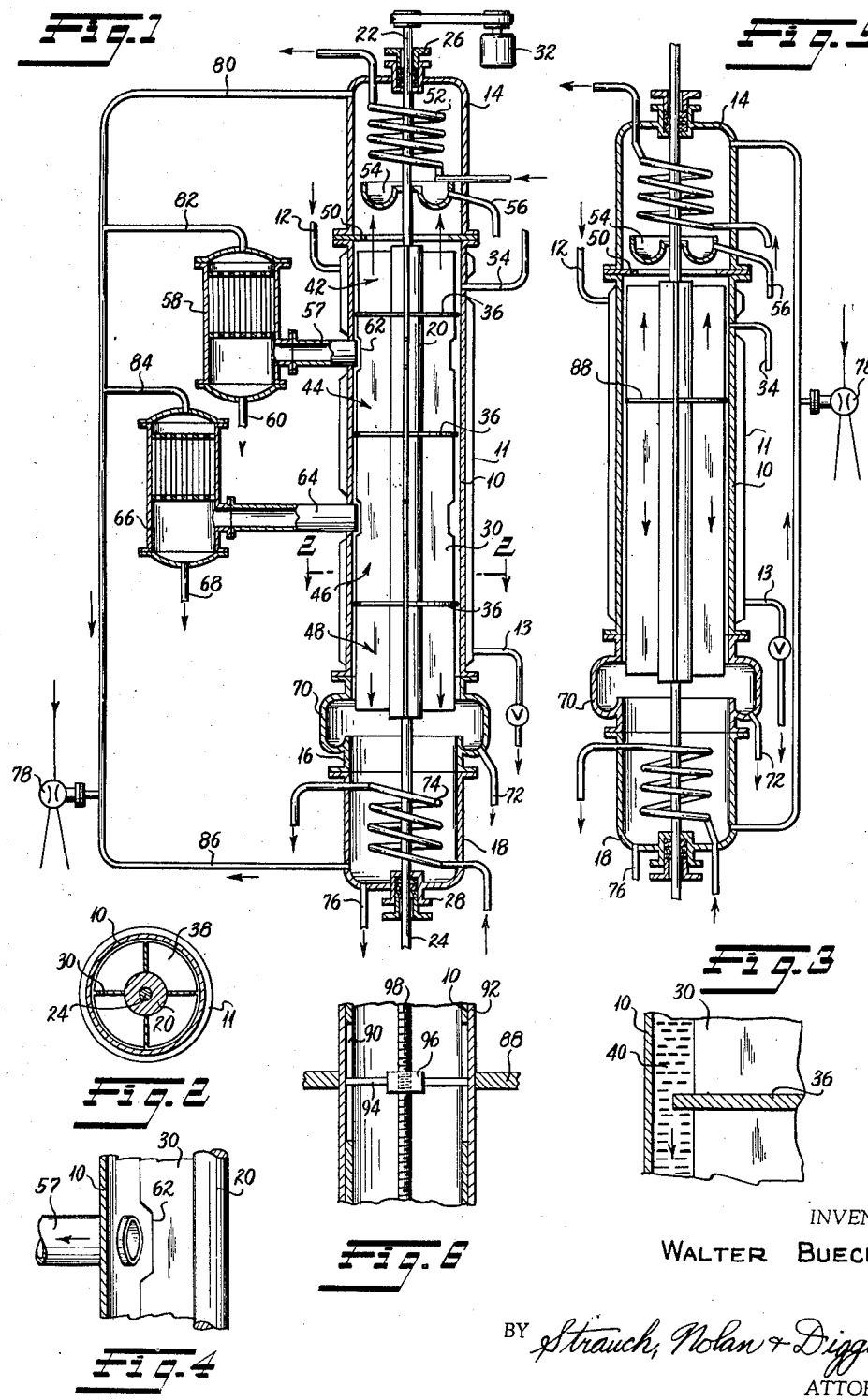

METHOD AND APPARATUS FOR THE FRACTIONAL DISTILLATION OF MULTICOMPONENT MIXTURES

Walter Bueche, Ludwigshafen, Rhine, Germany

Application August 27, 1954, Serial No. 452,641

Claims priority, application Germany February 17, 1951

15 Claims. (Cl. 202—64)

This invention relates to methods and apparatus for the fractional distillation of liquid mixtures of a plurality of substances having different boiling points especially when one or more of the substances may be damaged or decomposed by heat.

Liquid mixtures of a plurality of substances whose boiling points are not too close together can be separated into their components without special rectification devices by heating them to boiling, condensing the escaping vapors and collecting the condensate fractionally. When working in this way, however, the distillate is always exposed for a long time to the action of the boiling temperature which rises as the distillation progresses, so that when separating readily decomposable substances, losses occur and also in some cases the transfer of heat is impaired by the deposition of solid substances and consequently the duration of the distillation is prolonged.

These difficulties can be avoided by reducing the boiling temperature by working in vacuo and also by carrying out the evaporation in thin liquid films, so that the substances to be separated are exposed to the vaporizing temperature for only a very short time. Thin film evaporators (see for example U.S. patent specification No. 1,870,445) have proved suitable for this purpose. In thin film evaporators, the liquid to be vaporized flows on the inner surface of a vertical, externally heated cylindrical or slightly conical tube and is spread out into a thin film by blades, movable wipers or brushes carried by a rotor arranged inside the tube.

Apparatus using heated rotation plates which are upwardly concave have also been used for this purpose (see U.S. patent specification No. 2,383,945). In such apparatus the liquid mixture to be separated is supplied at the middle of the plate, is uniformly spread out by centrifugal force and flows radially outward while vaporizing.

These prior art devices are mainly in use for the separation of mixtures of two components. The vaporizing surface is kept at a temperature which is above the boiling temperature of the more volatile component but below that of the less volatile component which leaves the apparatus without vaporizing. The vapors of the more volatile components are condensed and collected separately.

A separation of mixtures which contain more than two components of differing boiling points can be effected for example by passing the distillates a plurality of times through such an apparatus in which the temperature is raised for each batch corresponding to the increasing boiling temperatures of the most volatile remaining fraction. It can also be carried out by suitably arranging in succession an appropriate number of apparatus such as described above. In the first apparatus the most volatile component is expelled in the vapor phase, the less volatile components which remain liquid being led to the next apparatus which is heated to a corresponding higher temperature so that the second least volatile component is expelled, the remaining liquid component or components being separated in the said manner in a further one or more vaporizers. Such methods of working necessitate a considerable expenditure of time or apparatus.

Efforts have been made to separate continuously in a single apparatus heat-sensitive multicomponent mixtures in which the boiling points of the components are sufficiently far apart to render the use of special rectification apparatus unnecessary but the apparatus and procedures heretofore suggested have had certain inherent defects. In general, these prior art procedures either failed to obtain the desired sharpness of separation, or they have been expensive and difficult to operate.

Thin film vaporizers have been suggested for fractional distillation (see Patent No. 2,383,945). In such apparatus there is a fractionation in that the proportion of higher boiling components in the vapor becomes greater the greater the distance from the point of supply and by condensing the vapor along the apparatus and withdrawing condensate at different distances from the point of supply, fractions which contain a particular component preferentially may be obtained. A quality of separation equivalent to that of the batch method of operation cannot, however, be achieved with such apparatus because the vapors formed with differing composition at the heating surfaces mix and thus reduce the quality of the fractional condensation along the condenser surface. Thus, for example, the vapor which is formed immediately after the point of supply of the liquid to be distilled and which contains practically only the component of lowest boiling point, for lack of an ordered flow of vapor, may partly flow to that part of the surface of the condenser of which the condensate preferentially contains a fraction of higher boiling point and thus reduce the sharpness of separation of the apparatus.

Sharp separation of fractions may be obtained by the use of rectifying multistage apparatus such as that shown in Patent No. 2,606,146. Such apparatus is however expensive to construct and costly to operate because the fractions must be repeatedly evaporated and condensed with additional expenditure of heating energy and cooling water. For the protective separation of multicomponent mixtures of which the separation is possible, purely theoretically, discontinuously by simple fractional distillation, there therefore exists a demand for a simple continuously-operating process having the same sharpness of separation.

A major object of the present invention is to provide a method and apparatus for obtaining sharp separation of the components of a multicomponent mixture continuously in a single vaporizer.

Another object is to provide a thin film vaporizer having novel means for separating the least volatile components of a multicomponent mixture.

Another object is to provide a thin film vaporizer for separating the components of a multicomponent mixture in which different components are collected in the vapor state in separate compartments.

Another object is to provide a thin film vaporizer which is subdivided throughout its length into vapor sealed compartments.

Another object is to provide a method and apparatus for the fractional distillation of multicomponent mixtures at low pressures in which the components are protected from prolonged exposure to vaporizing temperature.

These and other objects and advantages reside in novel features of construction arrangement and combination of parts and in steps and operations as will hereafter be more fully set forth and pointed out in the appended claims.

Referring to the drawing:

Figure 1 is a diagrammatic vertical sectional view of one form of apparatus according to the present invention.

Figure 2 is a section taken on line 2—2 of Figure 1.

Figure 3 is an enlarged fragmentary vertical section showing the relation of a divider to the liquid film.

Figure 4 is an enlarged fragmentary vertical section showing vapor withdrawal conduits.

Figure 5 is a diagrammatic vertical section of a modified form of apparatus according to the present invention.

Figure 6 is a fragmentary sectional view showing divider adjusting mechanism.

Figure 1 shows apparatus capable of separating a mixture into five components of different volatility and comprises a substantially vertical, conical or cylindrical tubular chamber 10 which is externally heated by any suitable means such one or more steam jackets 11 having an inlet 12 and outlet 13. The upper end of the chamber is closed by a bell or cap 14 and the lower end of the chamber is closed by an annular member 16 and a container or receptacle 18. A rotor 20 is mounted on shafts 22 and 24 which are journalled respectively in pressure-tight bearings 26 and 28 in the cap 14 and container 18.

The rotor 20 is coaxial with the chamber 10 and is provided with a plurality of outwardly projecting vanes or blades 30 which extend outwardly into close proximity to the wall of the chamber 10. A suitable motor or engine 32 drives the rotor 20. The rotor speed and blade clearances may be those normally used in the film evaporators.

The liquid mixture to be separated enters through a conduit 34 located near the top of the chamber 10 and flows down the chamber wall by gravity. The blades or vanes 30 spread this descending liquid in a thin film along the heated inner wall of the chamber 10 by direct action and by centrifugal force. As the liquid flows down the heated wall the component of lowest boiling point first escapes in vapor form, then that of the next boiling point and so on. To a corresponding extent, the temperature of the film rises. The effect of this fractional vaporization can be enhanced by increasing the temperature of the heating surface along the distillation path to adapt it to the composition of the mixture. This increase in temperature may be accomplished by providing a plurality of separate, spaced heating units or jackets along the length of the chamber 10.

In order to obtain exact fractional separation of the individual components the chamber 10 is sub-divided in an axial direction into separate compartments by dividers 36 which are secured to the rotor 20 preferably perpendicular to the rotor axis. These dividers may be detachably or movably secured to the rotor. Each divider 36 may consist either of a circular disk or of sectors 38 arranged between the blades 30 of the rotor 20. As shown in Figure 3, each divider 36 projects outwardly slightly beyond the outer edges of the blades 30 and extends into the liquid film but sufficient space is provided between the divider 36 and the inner wall of the chamber 10 to permit the liquid film indicated at 40 to flow down the chamber wall. The dividers 36 thus provide a vapor seal between adjacent compartments while permitting free flow of the liquid from one compartment to the next lower compartment. In the embodiment shown in Figure 1 there are three dividers 36 which form four separate compartments within the chamber 10 as indicated at 42, 44, 46, and 48, and while that apparatus is normally operated so that substantially the same pressure exists throughout, centrifugal force makes the film 40 sufficiently stable that small differences of pressure will not cause mixing of the vapor in one compartment with the vapor in the next.

As the liquid enters through the conduit 34 the most volatile fraction is first evaporated above the upper divider 36. This vapor rises into the cap 14 and a flange or collar 50 extends inwardly at the top of the chamber wall to prevent any unevaporated liquid from passing up into the cap 14 with the vapor. The vapor in the cap 14 may be withdrawn and condensed in any suitable condenser or, as shown in Figure 1, the cap 14 may be provided with a condensing coil 52 and the condensed vapor collected in a trough 54 and withdrawn through a suitable drain 56.

After the liquid passes the upper divider 36, its temperature increases and the next most volatile component is vaporized in the compartment 44 between the upper and intermediate dividers 36. This vapor may be withdrawn through a conduit 57 and condensed in a suitable condenser 58 from which the condensate may be withdrawn through an outlet 60. As shown in Figure 4, the conduit 57 extends through the wall and into the chamber 10 by an amount greater than the thickness of the falling film of liquid so that the vapor will not be contaminated with the less volatile liquid of the film. The blades 30 are notched as indicated at 62 to clear the projecting end of the conduit 57. A second conduit 64 and condenser 66 having an outlet 68 are provided for the compartment 46 formed by the intermediate and lower dividers 36 to remove and condense the vapor formed in the compartment 46.

Beneath the lowest divider 36 there is unevaporated liquid and also vapor of the least volatile of the vaporizable fractions. The intermediate member 16 has an annular channel 70 opposite the lower end of the blades 30 and the unevaporated liquid flowing down the walls of the chamber 10 is thrown outward by the centrifugal action of the blades into this annular channel 70 and is removed through a conduit 72. The vapor of the least volatile of the vaporizable fraction passes the channel 70 and enters the container 18 where it may be either withdrawn and condensed separately or, as shown in Figure 1, may be condensed by the coil 74 and withdrawn through the conduit 76.

The entire system may be maintained at a predetermined pressure by a pump 78 which is connected to the cap 14, condensers 58 and 66 and container 18 by conduits 80, 82, 84, 86 respectively. Ordinarily a sufficiently low pressure is maintained so that the boiling points of the components will be below the temperature at which the components may decompose. It is apparent however that this apparatus can function at high as well as low pressures.

When the mixture to be fractionated contains more or less components than five, a larger or smaller number of dividers and condensers would be employed. It is important that there be a separate compartment for each vapor fraction.

For the fractionation of a liquid containing three components the apparatus may be particularly simple as shown in Figure 5. Only a single divider 88 is required and the most volatile fraction is recovered through the drain 56, the intermediate fraction through the drain 76 and the unvaporized fraction through the drain 72. It is sufficient to connect the pump 78 only to the cap 14 and container 18.

In order to provide for the fractionation of different liquid mixtures, the divider 88 is preferably vertically adjustable on the rotor. One suitable adjustment mechanism is shown diagrammatically in Figure 6. The rotor 20 is a hollow tube and is provided with vertical slots 90. The divider 88 is carried by slides 92 which engage the surface of the rotor between the blades and cover the slots 90. Pins 94 secured to the slides 92 extend through the slots 90 and carry a nut 96 in which a screw 98 is threaded. Rotation of the screw 98 will move the divider 88 longitudinally of the rotor and thus change the relative sizes of the upper and lower chambers. When shaft 22 or shaft 24 is made hollow and the screw 98 rotatably mounted in the hollow shaft but held against axial movement, the position of the divider 88 may be adjusted from outside the housing without interrupting the operation.

The present invention relates to the fractionation of mixtures whose components have boiling points which differ sufficiently that rectification is unnecessary. Referring to Figure 5 for example, the mixture flows down the wall 10 from the inlet 34 and the lowest boiling fraction is vaporized. The vaporization of this lowest boiling fraction prevents the temperature of the liquid from rising sufficiently to cause substantial vaporization of the intermediate fraction so that substantially pure vapor of the most volatile fraction is obtained above the divider 88.

Below the divider 88, the temperature rises because the most volatile of the remaining components has a higher boiling point and that component is vaporized. The vapor in the compartment below the divider 88 is thus substantially pure vapor of the intermediate component. Since both compartments are at substantially the same pressure, the seal formed by the divider 88 is sufficient to prevent mixing of the vapors while the liquid is free to flow down the wall 10 past the edge of the divider 88.

From the foregoing it is apparent that I am able to attain the objects of my invention and provide a simple and efficient method and apparatus for the fractionation of multicomponent liquid mixtures whose components have sufficiently different boiling points that rectification is unnecessary. The sharpness of separation obtained compares favorably with batch methods and since the method can be practiced and the apparatus operated at low pressures with the liquid being subjected to vaporizing temperatures in small amounts and for a brief time, it is possible to fractionate heat-sensitive substances without damaging or decomposing them.

This application is a continuation-in-part of my application Serial No. 269,986 filed February 5, 1952.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for fractional distillation of a multicomponent liquid mixture comprising a substantially vertical tube substantially circular in horizontal section, means for introducing the liquid to be distilled adjacent the top of said tube, a rotor within and substantially coaxial with said tube, vanes on said rotor extending longitudinally of said rotor throughout substantially the effective length of said rotor and extending outwardly into close proximity to said tube, means for rotating said rotor to spread the liquid in a thin film on the wall of said tube, means for heating the tube to vaporize the liquid, imperforate transverse divider means on said rotor extending outward from said rotor partially through the film of liquid to divide the tube into separate vapor chambers while permitting free flow of the liquid down the wall of the tube between the wall and the divider, and means for withdrawing vapor from the separate chambers.

2. Apparatus as defined in claim 1 in which the divider means comprises a substantially horizontal disk secured to said rotor and extending outwardly therefrom and projecting into the thin film of liquid on the tube wall.

3. Apparatus as defined in claim 1 in which the means for withdrawing the vapor comprises a conduit extending through the tube wall and projecting into the tube a distance greater than the thickness of the liquid film.

4. Apparatus for fractional distillation of a multicomponent liquid mixture comprising a substantially vertical tubular chamber substantially circular in horizontal section, means for introducing the liquid to be distilled adjacent the top of said chamber, a rotor extending longitudinally and substantially coaxially of said tubular chamber, vanes on said rotor extending longitudinally of said rotor and outwardly into close proximity to the wall of said chamber, means for rotating said rotor to spread the liquid in a thin film on the wall of said chamber, means for heating the tube to vaporize the liquid, a plurality of substantially imperforate horizontal disks spaced longitudinally along said rotor extending outward from said rotor partially through the film of liquid to divide the tube into separate vapor tight compartments while permitting free flow of the liquid down the chamber wall through said vapor compartments, and means for withdrawing vapor from the separate vapor compartments.

5. In a thin film evaporater having a first chamber defined by a substantially vertical tubular wall and a rotor having vanes extending longitudinally outward into close proximity to said wall for spreading the liquid to be evaporated in a thin film on said wall, said vanes being substantially continuous longitudinally and radially, means for separating unevaporated liquid from vapor comprising an annular chamber surrounding the lower end of said rotor and vanes to receive unevaporated liquid, said annular chamber having a larger horizontal cross sectional area than said first chamber, means for withdrawing said unevaporated liquid from the annular chamber, and a second chamber beneath said rotor and said annular chamber for receiving vapor and means for removing said vapor from said second chamber.

6. A thin film evaporater as defined in claim 5 in which the second chamber is provided with means for condensing the vapor and means for removing the condensed vapor.

7. Apparatus for fractional distillation of a multicomponent liquid mixture comprising a substantially vertical tube substantially circular in horizontal section, means for introducing the liquid to be distilled adjacent the top of said tube, a rotor within and substantially coaxial with said tube, vanes on said rotor extending longitudinally of said rotor and outwardly into close proximity to said tube, means for rotating said rotor to spread the liquid in a thin film on the wall of said tube, means for heating the tube to vaporize the liquid, imperforate transverse divider means carried by said rotor and extending outward from said rotor beyond the outer edges of said vanes and partially through the film of liquid during operation of said apparatus to divide the tube into separate compartments while permitting free flow of the liquid down the walls of the tube, means for withdrawing vapor from the separate compartments and means for maintaining substantially constant pressure throughout the length of said tube.

8. Apparatus as defined in claim 7 including means for adjusting said divider means longitudinally of said rotor to vary the size of said compartments.

9. The method of fractional distillation of a multicomponent liquid mixture which comprises flowing the liquid down a substantially vertical circular tube, spreading the liquid on the tube in a thin film, agitating said thin film on said tube during flow of the liquid down said tube dividing said tube into longitudinal spaced vapor tight compartments while permitting said film to flow between compartments, continuously raising the temperature of the liquid film as it flows down said tube whereby different components of the mixture are vaporized in each compartment, and withdrawing the vapor from each compartment.

10. The method defined in claim 9 including maintaining the liquid and vapor at a predetermined pressure.

11. An apparatus for evaporating and concentrating liquids, having a chamber defined by a substantially vertical cylindrical wall, means for introducing liquid to be concentrated adjacent the top of said chamber, closure means at the top of said chamber for preventing the exit of vapor, means for heating a predetermined area of said chamber for vaporizing a portion of the liquid, a rotor rotatably mounted within said chamber coaxially of said wall, blades on said rotor extending longitudinally thereof and projecting outwardly into close proximity to the wall of said chamber, said blades being substantially continuous vertically and radially means for rotating said rotor to spread liquid in a thin film on the wall of said chamber, said vanes extending longitudinally at least throughout the length of the heated chamber whereby the entire thin film is maintained in turbulent flow, means beneath said chamber and communicating therewith for separating vapor and unevaporated liquid, outlet means adjacent the bottom of said chamber to remove separately said vapor and said unevaporated liquid.

12. The combination in accordance with claim 11 further comprising an enlarged chamber defined by a housing disposed below said chamber, said enlarged chamber having a larger cross-sectional area than said chamber and wherein said vanes extend into said enlarged chamber.

13. An apparatus for evaporating and concentrating liquids, having a chamber defined by a substantially vertical cylindrical wall, means for introducing liquid to be concentrated adjacent the top of said chamber, closure means at the top of said chamber for preventing the exit of vapor, a substantially enlarged chamber in communication with and extending at least partially below said chamber, means for heating a predetermined area of said walls to a temperature sufficient to vaporize a portion of said liquid, said means for heating terminating above said enlarged chamber, a rotor rotatably mounted within said chamber coaxially of said wall, blades on said rotor extending longitudinally thereof and projecting outward into close proximity of said wall, said blades being substantially continuous vertically and longitudinally, means for rotating said rotor to spread the liquid in a turbulent thin film on said wall of said chamber, said vanes extending downwardly to at least approximately the upper end of said enlarged chamber, outlet means for said vapor and separate outlet means for unevaporated liquid, both said outlet means removing said liquid and vapor from said enlarged chamber at a point below the heated portion of the walls of said chamber.

14. Apparatus for fractional distillation of a multicomponent liquid mixture comprising a substantially vertical tubular chamber substantially circular in horizontal section, means for introducing the liquid to be distilled adjacent the top of said chamber, a rotor extending longitudinally and substantially coaxially of said tubular chamber, vanes on said rotor extending longitudinally of said rotor and outwardly into close proximity to the wall of said chamber, said vanes being substantially continuous vertically and radially means for rotating said rotor to spread the liquid in a thin film on the wall of said chamber, means for heating the tube to vaporize the liquid, a plurality of substantially imperforate horizontal discs spaced longitudinally along said rotor extending outward from said rotor partially through the film of liquid and contiguous to the walls of the chambers to permit free flow of the liquid down the walls of the chamber and to divide the chamber into separate vapor tight compartments, said discs preventing passage of the vapor between compartments and means for withdrawing vapor from the separate vapor tight compartments.

15. Apparatus for the fractional distillation of multisubstance mixtures comprising a cylindrical tube, means for heating the wall of said tube, means for introducing the mixture to be distilled into said tube, a rotor rotatably mounted in said tube for rotation coaxially of said tube, blades on said rotor extending outward into close proximity to the wall of said tube to spread the liquid mixture in a thin film on said wall, imperforate disc means carried by said rotor substantially perpendicular to the axis of said rotor and extending outward from said rotor partially through the liquid film on the wall of the tube to divide said tube longitudinally into separate vapor sealed chambers and means for independently withdrawing vapor from each of said chambers.

References Cited in the file of this patent

UNITED STATES PATENTS

| | | |
|---|---|---|
| 1,262,875 | Trumble | Apr. 16, 1918 |
| 1,732,805 | D'Yarmett | Oct. 22, 1929 |
| 2,068,091 | Stoltz | Jan. 19, 1937 |
| 2,383,945 | Shantz | Sept. 4, 1945 |
| 2,403,978 | Hickman et al. | July 16, 1946 |
| 2,562,153 | Taylor | July 24, 1951 |
| 2,606,146 | Luten | Aug. 5, 1952 |
| 2,751,338 | Schwemberger | June 19, 1956 |
| 2,758,061 | Geller | Aug. 7, 1956 |

FOREIGN PATENTS

| | | |
|---|---|---|
| 308,727 | Great Britain | Mar. 25, 1929 |
| 330,805 | Great Britain | June 19, 1930 |
| 413,972 | Italy | Oct. 27, 1945 |
| 447,065 | Italy | Aug. 25, 1948 |